(12) United States Patent
Chin et al.

(10) Patent No.: US 11,362,955 B2
(45) Date of Patent: Jun. 14, 2022

(54) APPLICABILITY OF POLICIES FOR WIRELESS COMMUNICATION

(71) Applicant: QUALCOMM Incorporated, San Diego, CA (US)

(72) Inventors: Tom Chin, San Diego, CA (US); Ajith Tom Payyappilly, San Diego, CA (US); Juan Zhang, San Diego, CA (US); Lenaig Genevieve Chaponniere, La Jolla, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/421,911

(22) Filed: May 24, 2019

(65) Prior Publication Data
US 2020/0007450 A1 Jan. 2, 2020

Related U.S. Application Data

(60) Provisional application No. 62/691,517, filed on Jun. 28, 2018.

(51) Int. Cl.
*H04L 47/20* (2022.01)
*H04W 72/04* (2009.01)
*H04W 88/02* (2009.01)

(52) U.S. Cl.
CPC ............. *H04L 47/20* (2013.01); *H04W 72/04* (2013.01); *H04W 88/02* (2013.01)

(58) Field of Classification Search
CPC ................................ H04L 47/20; H04W 72/04
See application file for complete search history.

(56) References Cited

U.S. PATENT DOCUMENTS

| 10,530,851 B1* | 1/2020 | Hart | G06F 9/5027 |
| 2012/0269167 A1* | 10/2012 | Velev | H04W 36/14 |
| 2012/0320827 A1* | 12/2012 | Zhao | H04W 4/00 |

(Continued)

OTHER PUBLICATIONS

"3rd Generation Partnership Project; Technical Specification Group Core Network and Terminals; Access to the 3GPP 5G Core Network (5GCN) via Non-3GPP Access Networks (N3AN); Stage 3 (Release 15)", 3GPP Standard; Technical Specification; 3GPP TS 24.502, 3rd Generation Partnership Projet (3GPP), Mobile Competence Centre, 650, Route Des Lucioles, F-06921, Sophia-Antipolis Cedex, France, vol. CT WG1, No. V15.0.0, Jun. 21, 2018, XP051472991, [retrieved on Jun. 21, 2018], pp. 1-36.

(Continued)

*Primary Examiner* — Ronald B Abelson
(74) *Attorney, Agent, or Firm* — Patterson & Sheridan, LLP

(57) ABSTRACT

Certain aspects of the present disclosure provide techniques for selecting policies for routing of data traffic. Certain aspects provide a method for wireless communication by a user-equipment (UE). The method generally includes selecting at least one policy for routing of data traffic to a network, wherein the policy comprise an access network discovery and selection policy (ANDSP) if the UE has the ANDSP provisioned regardless of whether the UE is registered to evolved packet core (EPC) or fifth-generation core network (5GCN), and communicating the data traffic to the network based on the selection.

28 Claims, 8 Drawing Sheets

(56) References Cited

U.S. PATENT DOCUMENTS

| | | | |
|---|---|---|---|
| 2013/0012182 A1* | 1/2013 | Liao | H04W 48/16 |
| 2015/0312808 A1* | 10/2015 | Kiss | H04W 36/00 |
| 2018/0375902 A1* | 12/2018 | Wong | H04L 29/06 |
| 2019/0053104 A1* | 2/2019 | Qiao | H04W 28/24 |
| 2019/0261449 A1* | 8/2019 | Kim | H04W 80/02 |
| 2019/0268835 A1* | 8/2019 | Shan | H04W 48/16 |
| 2020/0053562 A1* | 2/2020 | Kim | H04W 12/06 |
| 2020/0107190 A1* | 4/2020 | Tang | H04W 12/037 |
| 2020/0280843 A1* | 9/2020 | Foti | H04W 12/00 |
| 2020/0304983 A1* | 9/2020 | Zhu | H04W 8/08 |

OTHER PUBLICATIONS

"3rd Generation Partnership Project; Technical Specification Group Services and System Aspects; Policy and Charging Control Framework for the 5G System; Stage 2 (Release 15)", 3GPP Standard; Technical Specification; 3GPP TS 23.503, 3rd Generation Partnership Projet (3GPP), Mobile Competence Centre, 650, Route Des Lucioles, F-06921, Sophia-Antipolis Cedex, France, vol. SA WG2, No. V15.2.0, Jun. 19, 2018, XP051472862, [retrieved on Jun. 19, 2018], Section 6.1, pp. 1-67.

International Search Report and Written Opinion—PCT/US2019/034187—ISA/EPO—dated Aug. 16, 2019.

Nokia et al., "Discussion on the Scope of TS 24.568", 3GPP Draft; C1-182320_DISC_24568_SCOPE, 3rd Generation Partnership Projet (3GPP), Mobile Competence Centre, 650, Route Des Lucioles, F-06921, Sophia-Antipolis Cedex, France, vol. CT WG1, No. Kunming (China); Apr. 16, 2018-Apr. 20, 2018 Apr. 9, 2018, XP051434675, Retrieved from the Internet: URL:http://www.3gpp.org/ftp/tsg%5Fct/WG1%5Fmm%2Dcc%2Dsm%5Fex%2DCN1/TSGC1%5F110%5FKunming/docs/ [retrieved on Apr. 9, 2018], Section 2, 4 pages.

Qualcomm Incorporated: "Applicability of UE Policies and UE Configuration Parameters upon Inter-System Change between N1 mode and S1 mode", 3GPP Draft; C1-184249, 3rd Generation Partnership Projet (3GPP), Mobile Competence Centre, 650, Route Des Lucioles, F-06921, Sophia-Antipolis Cedex, France, vol. CT WG1, No. Sophia-Antipolis (France); Jul. 9, 2018-Jul. 13, 2018 Jul. 6, 2018, XP051465751, Retrieved from the Internet: URL:http://www.3gpp.org/ftp/Meetings%5F3GPP%5FSYNC/CT1/Docs [retrieved on Jul. 6, 2018], Section 2, 5 pages.

* cited by examiner

APPLICABILITY OF POLICIES FOR WIRELESS COMMUNICATION

CROSS-REFERENCE TO RELATED APPLICATIONS

This application claims benefit of U.S. Provisional Patent Application Ser. No. 62/691,517, filed Jun. 28, 2018, which is expressly incorporated herein by reference in its entirety.

BACKGROUND

Field of the Disclosure

Aspects of the present disclosure relate generally to a wireless communication system, and more particularly, to selection of policies for routing of data traffic via the wireless communication system.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more BSs may define an eNodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques for selecting policies for routing of data traffic.

Certain aspects provide a method for wireless communication by a user-equipment (UE). The method generally includes selecting at least one policy for routing of data traffic to a network, wherein the policy comprise an access network discovery and selection policy (ANDSP) if the UE has the ANDSP provisioned regardless of whether the UE is registered to evolved packet core (EPC) or fifth-generation core network (5GCN), and communicating the data traffic to the network based on the selection.

Certain aspects provide an apparatus for wireless communication. The apparatus generally includes a processing system configured to select at least one policy for routing of data traffic to a network, wherein the policy comprise an ANDSP if the apparatus has the ANDSP provisioned regardless of whether the apparatus is registered to EPC or 5GCN, and a transceiver configured to communicate the data traffic to the network based on the selection.

Certain aspects provide a computer-readable medium having instructions stored thereon to cause an apparatus to select at least one policy for routing of data traffic to a network, wherein the policy comprise an ANDSP if the apparatus has the ANDSP provisioned regardless of whether the apparatus is registered to EPC or 5GCN, and communicate the data traffic to the network based on the selection.

Certain aspects provide an apparatus for wireless communication. The apparatus generally includes means for selecting at least one policy for routing of data traffic to a network, wherein the policy comprise an ANDSP if the apparatus has the ANDSP provisioned regardless of whether the apparatus is registered to EPC or 5GCN, and means for communicating the data traffic to the network based on the selection.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
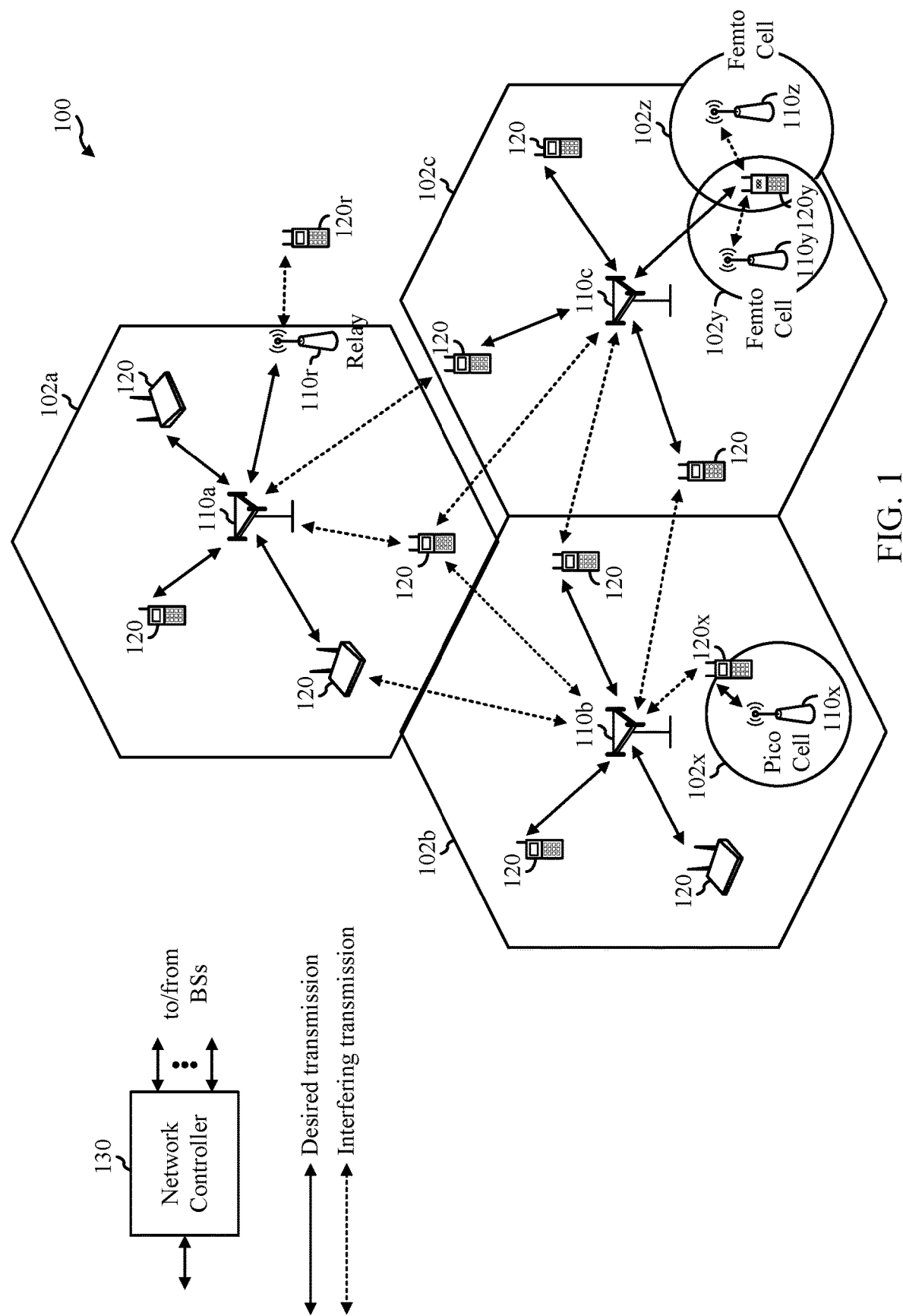
FIG. 1 is a block diagram conceptually illustrating an example telecommunications system, in accordance with certain aspects of the present disclosure.

Aspects of the present disclosure provide apparatus, methods, processing systems, and computer readable mediums for selecting wireless communication policies for routing data traffic.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a BS 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the BS 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, for example, directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink.

A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
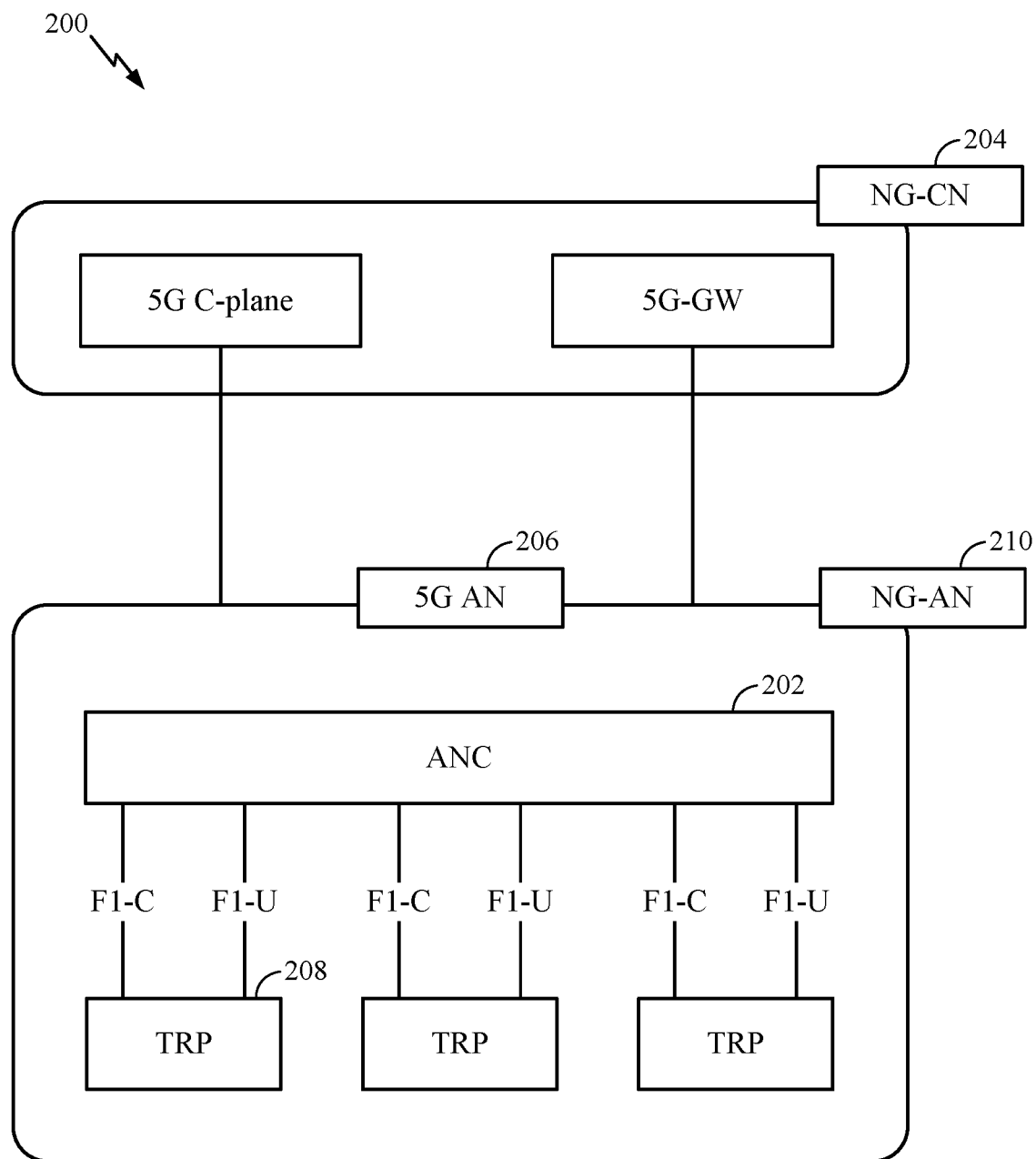
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
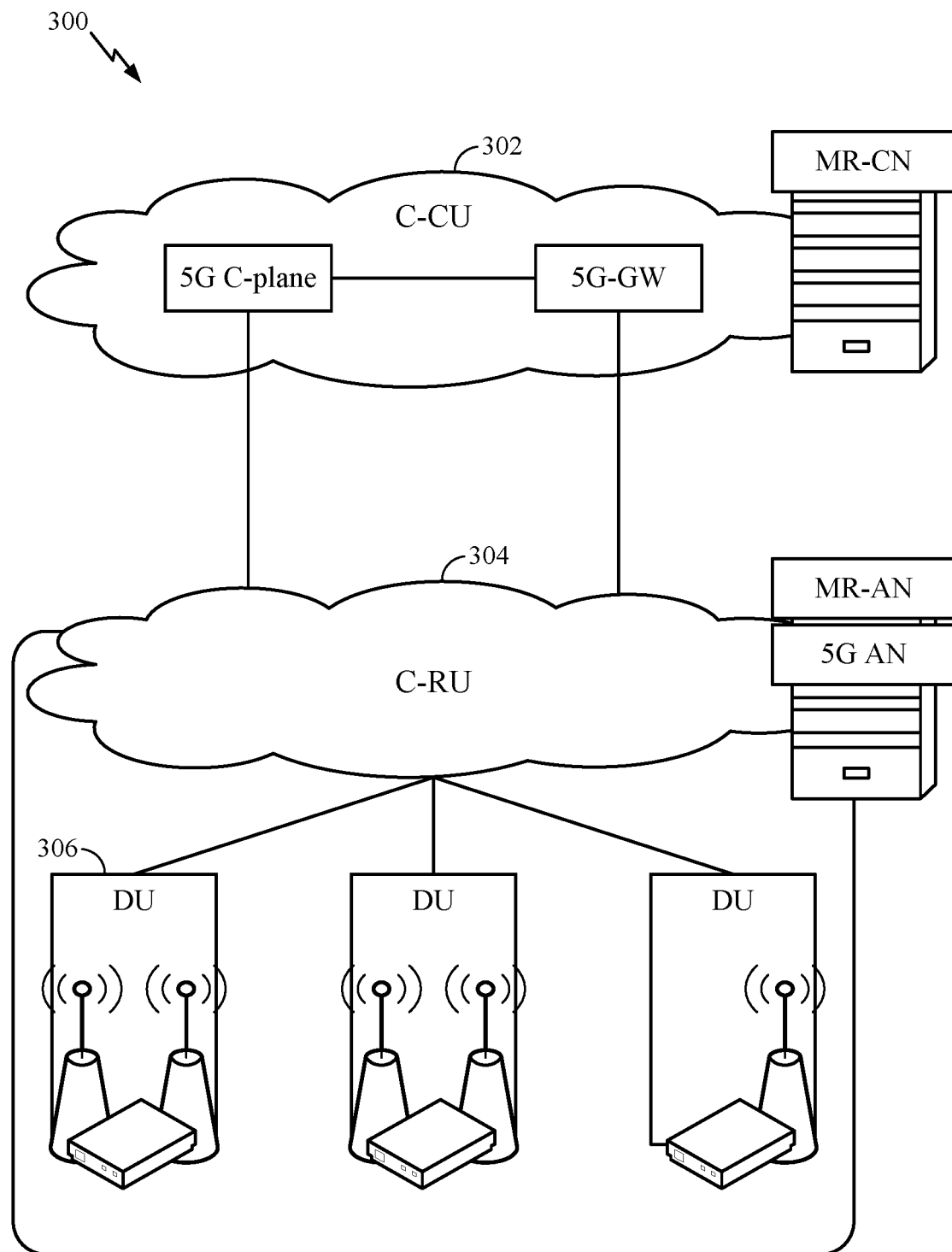
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
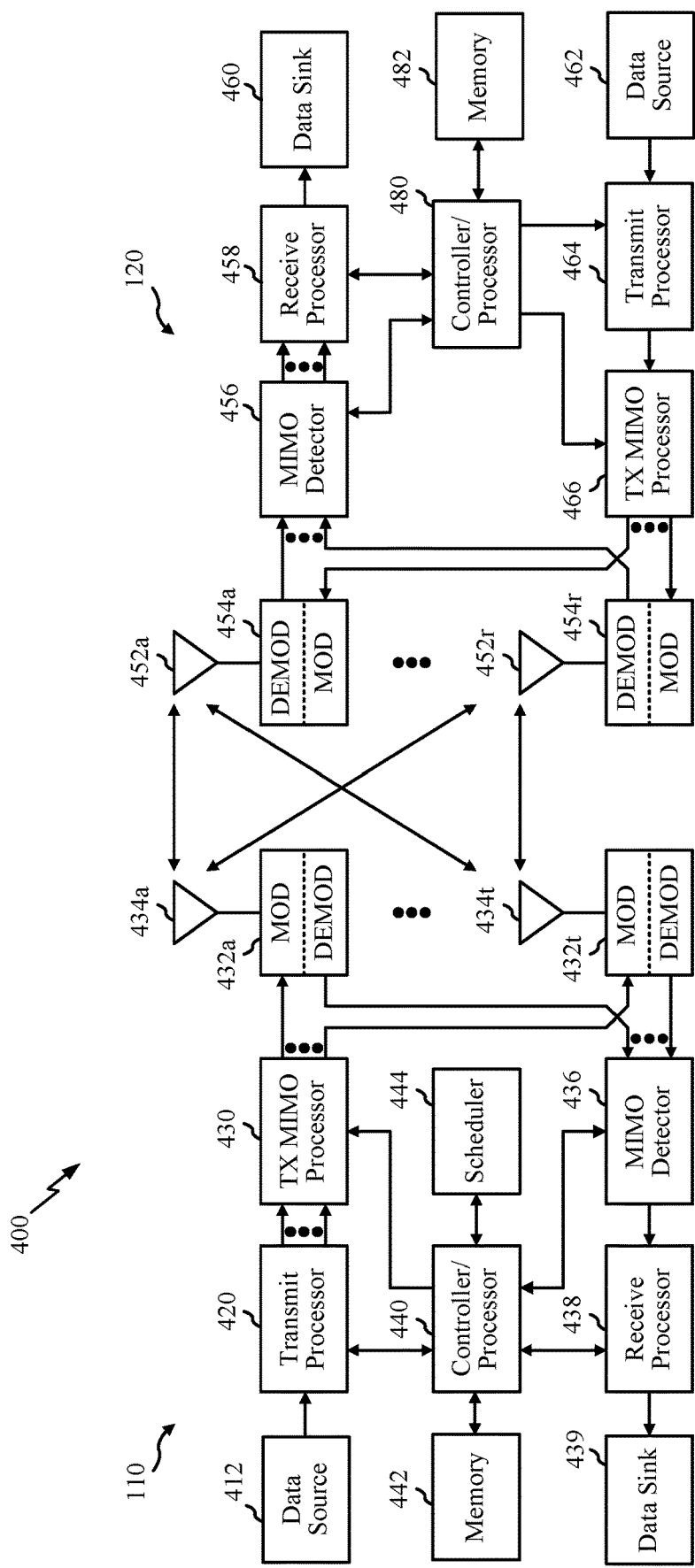
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of various processes for the techniques described herein. The processor 480 and/or other processors and modules at the UE 120 may also perform or direct, e.g., the execution of the functional blocks illustrated in FIG. 8, and/or other processes for the techniques described herein. The processor 440 and/or other processors and modules at the BS 110 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
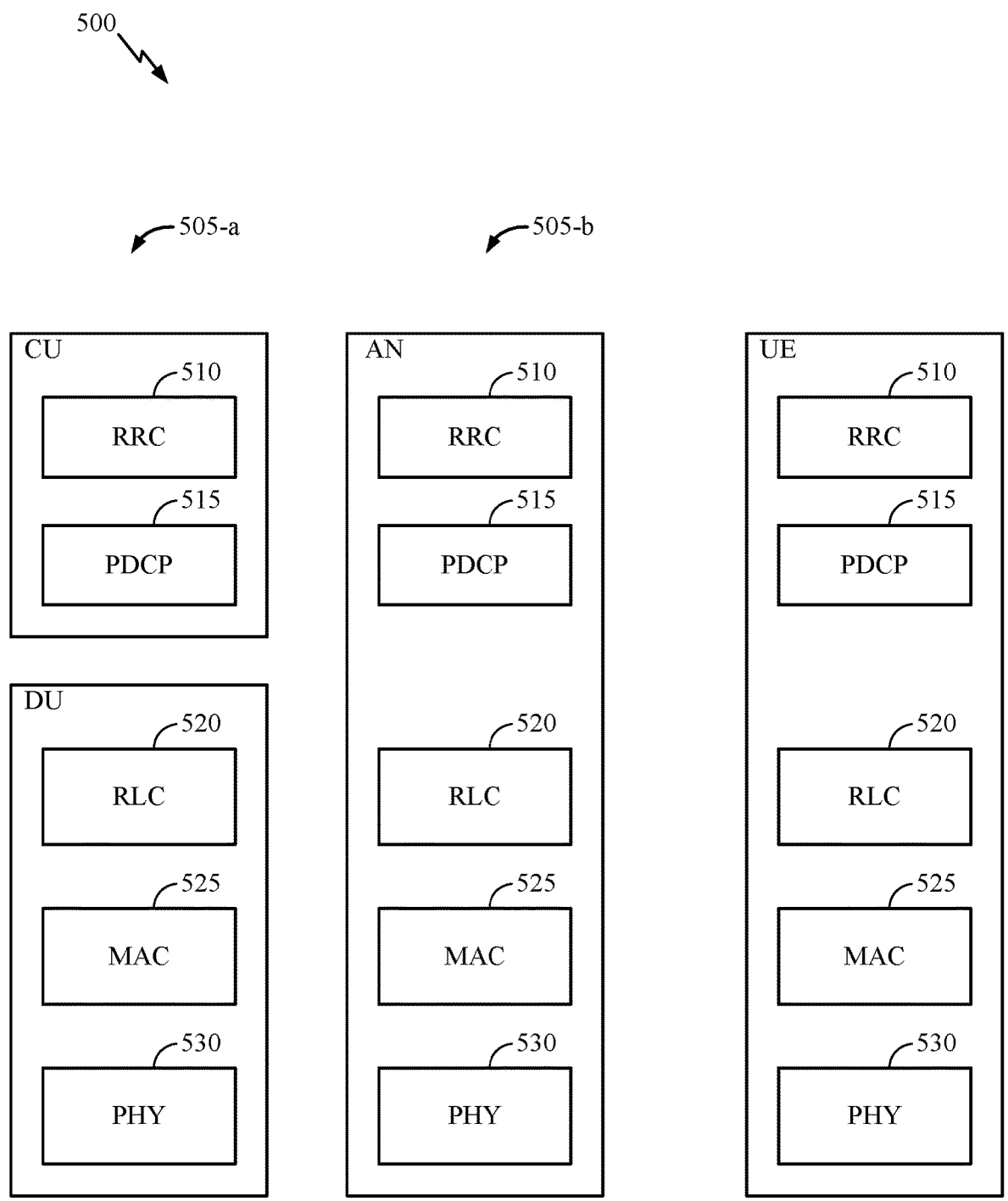
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
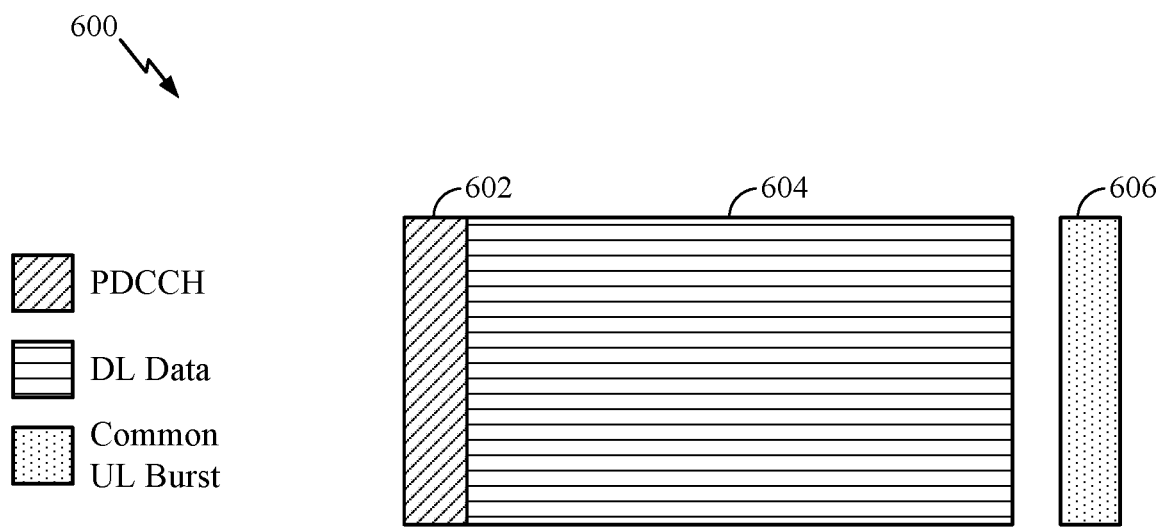
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
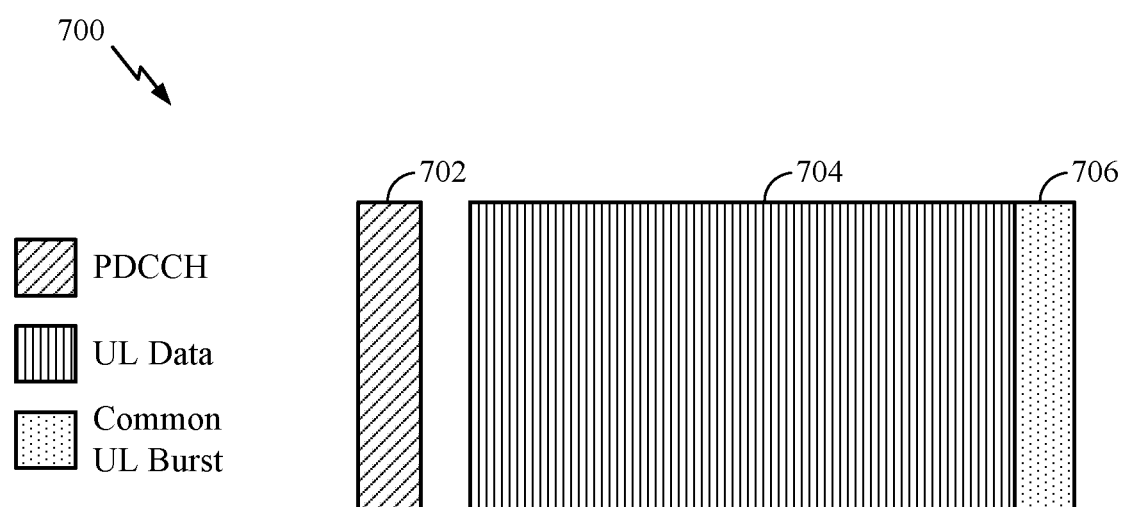
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe 700 and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Techniques for Applying Wireless Communication Policies

In an evolved packet system (EPS), a user-equipment (UE) may be provisioned with configuration parameters via Open Mobile Alliance (OMA) Device Management (DM), universal subscriber identity module (USIM) or other implementation specific means. In a fifth-generation system (5GS), the System Aspects Working Group 2 (SA2) architecture has defined two types of UE policies, the UE route selection policy (URSP) and the access network discovery and selection policy (ANDSP) which are delivered to the UE over non-access stratum (NAS) signaling. While the applicability of some of the configuration parameters provided by these policies are confined to one of EPS and 5GS and some of them apply to both systems, there are a number of the configuration parameters for which applicability and expected UE behavior upon inter-system change is currently not clearly defined.

The ANDSP may be used by the UE for selecting a non-third generation partnership project (non-3GPP) access network. The ANDSP may include only rules that aid the UE in selecting a wireless local area network (WLAN) access network. The set of parameters that may be included in WLAN selection policy (WLANSP) rules in the ANDSP may be the same as that which may be included in WLANSP rules in an access network discovery and selection function (ANDSF) for EPS. ANDSF assists UEs to discover non-3GPP access networks. The ANDSP may include information for evolved packet data gateway (ePDG) selection which is a fourth generation (4G) access node.

Figure 8:
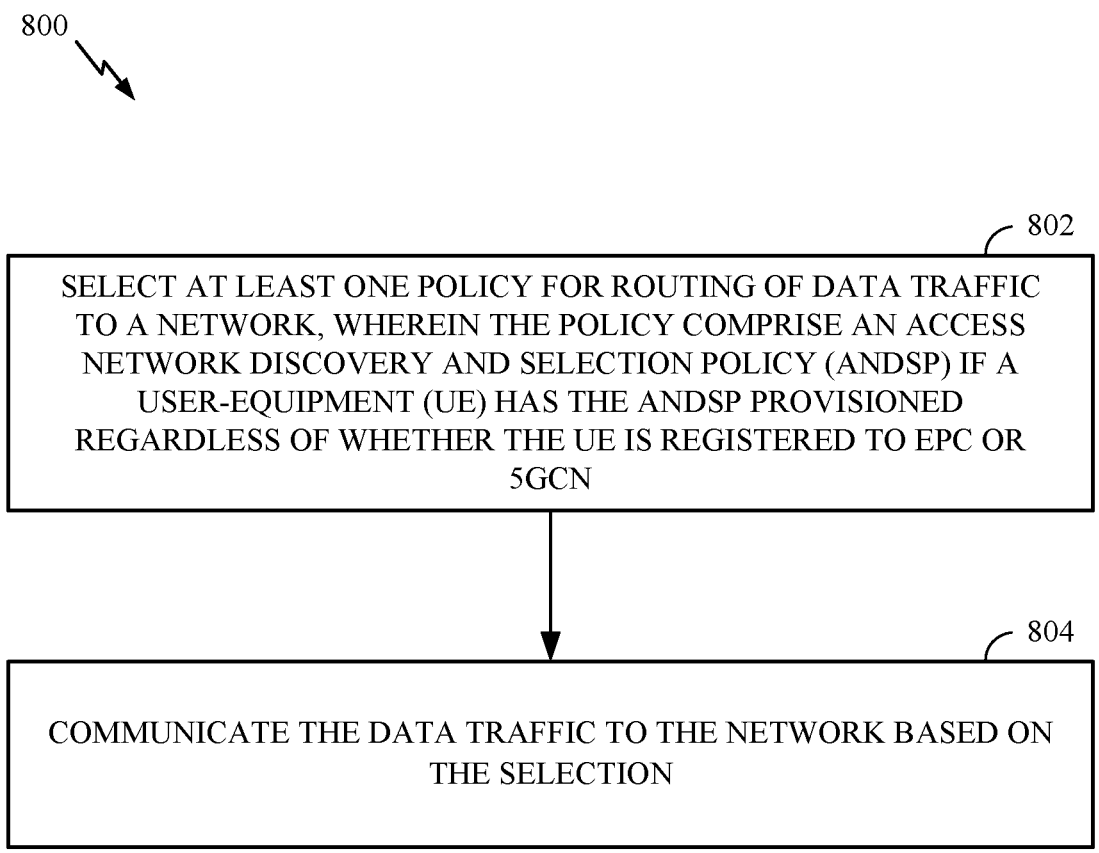
FIG. 8 is a flow diagram illustrating example operations for wireless communication by a user-equipment (UE), in accordance with certain aspects of the present disclosure.

FIG. 8 is a flow diagram illustrating example operations 800 for wireless communication, in accordance with certain aspects of the present disclosure. The operations 800 may be performed by a UE, such as the UE 120.

The operations 800 begin, at block 802, by selecting at least one policy for routing of data traffic to a network. The policy may include an ANDSP (e.g. for the selection of a non-3GPP access node) if the UE has the ANDSP provisioned regardless of whether the UE is registered to evolved packet core (EPC) or fifth-generation core network (5GCN). For example, a UE may use an ePDG identifier configuration, a non-3GPP inter-working function (N3IWF) identifier configuration and non-3GPP access node selection information from ANDSP to select a non-3GPP access node in cases including when the UE is registered to the 5GCN via 3GPP access, when the UE is registered to the EPC via 3GPP access and when the UE is not registered to any core network (CN) via 3GPP access. At block 804, the UE communicates the data traffic to the network based on the selection.

In other words, given that WLANSP rules in ANDSP for 5GS may be equivalent of WLANSP rules in ANDSF for EPS as described herein, and to maintain the current behavior of UEs in EPS with regards to access network discovery and selection without impact by new 5GS policies, a UE may apply ANDSP for node selection whenever ANDSP is provisioned regardless of the core network to which the UE is registered.

The URSP may be used by the UE to determine how to route outgoing traffic. Traffic may be routed to an established protocol data unit (PDU) session, may be offloaded to non-3GPP access outside a PDU session, or may trigger the establishment of a new PDU session. URSP includes a list of URSP rules, a traffic descriptor used to determine if each rule is applicable to outgoing traffic, and a list of route selection descriptors.

In certain aspects, the route selection descriptors may include a list of parameters to be used for the PDU session. Several of the parameters in the traffic descriptor may be specific to 5GS (e.g., non-IP descriptors for Ethernet PDU sessions and unstructured PDU sessions, data network name (DNN)). Similarly several parameters in the route selection descriptor may be specific to 5GS and may not have an equivalent parameter in EPS. Thus, the policy for the routing of the data traffic described with respect to FIG. 8 may include a URSP only if the UE is registered to a 5GCN. For example, the UE may be restricted to using URSP only when the UE is registered to 5GCN. In otherwords, if the UE is connected over 3GPP access to 5GCN, the policy selected at block 802 may include URSP for the routing of the data traffic. On the other hand, if the UE is connected over 3GPP access to EPC, the policy may include ANDSF for the routing of the data traffic.

In some cases, a UE may be connected to the 5GCN via next generation radio access network (NG-RAN) and the UE may apply URSP for the routing of the data. For example, the UE may apply the URSP due to a new application requesting a PDU session or due to a non-3GPP access becoming available. The URSP rule may indicate that non-3GPP access is preferred and maps the session to a certain DNN. The UE may then apply ANDSP to select a non-3GPP access node and ends up selecting an ePDG. Thus, the session may be established as a PDN connection over ePDG in EPC.

In certain aspects of the present disclosure, to maintain the legacy UE behavior for UEs registered to the EPC, the UE may switch to using ANDSF after applying ANDSP in order to select the ePDG (e.g., a non-3GPP access node). For example, if the UE is connected to a 5GCN over 3GPP access and has connectivity over non-3GPP access to an EPC via an ePDG, the policy as described with respect to FIG. 8 may include URSP, ANDSP, and ANDSF for the routing of the data traffic over the non-3GPP access via the ePDG.

In certain aspects of the present disclosure, the UE may be restricted from performing a node selection after switching to using ANDSF since the UE has already selected ePDG. For example, the operations 800 described with respect to FIG. 8 may also include selecting the ePDG based on the ANDSP, where the UE does not perform access node selection of the ePDG based on the ANDSF after the selection of the ePDG.

In certain aspects, the UE may apply an inter-access point name (APN) routing policy (IARP) to select an access point name (APN) for the PDN connection, which may be different from the DNN indicated by the URSP rule. For example, the operation 800 may include establishing a PDN connection for the routing of the data traffic over the ePDG by selecting an APN for the PDN connection based on an IARP.

In some cases, a UE may be out of 3GPP coverage, and thus, neither connected to 5GCN nor EPC. However, non-3GPP coverage may be available. Therefore, the UE may select a non-3GPP access node. If the UE applies ANDSF to select the non-3GPP network, the UE may be unable to select a N3IWF since ANDSF does not contain any N3IWF selection information. On the other hand, if the UE applies ANDSP, the UE may be able to select N3IWF and ePDG since ANDSP includes selection information for both N3IWF and ePDG. In certain aspects of the present disclosure, the UE may apply ANDSP in this scenario so that the UE is able to select N3IWF and ePDG using the ANDSP. That is, when the UE is not registered to the 5GCN via 3GPP access and is not registered to the EPC via 3GPP access, the UE may apply ANDSP for non-3GPP access node selection.

In certain aspects, selecting the at least one policy, at block 802 of FIG. 8, may include selecting a N3IWF based on ANDSP if an ANDSF does not include N3IWF selection information and the data is being routed over the selected N3IWF. In certain aspects, the operations 800 may also include establishing a DNN connection for the routing of the data traffic over the N3IWF by selecting a DNN based on a URSP rule, as described herein.

In certain aspects, the UE may be connected over a third generation partnership project (3GPP) access to a 5GCN and have connectivity over a non-3GPP access to an EPC via an ePDG. In this case, the policy may include URSP and the ANDSP for the routing of the data traffic over the 3GPP access via the 5GCN and may include ANDSF for the routing of the data traffic over the non-3GPP access via the ePDG.

In certain aspects, the UE may be connected over 3GPP access to an EPC and have connectivity over a non-3GPP access to a 5GCN via a N3IWF. In this case, the policy may include URSP and ANDSP for the routing of the data traffic over the N3IWF, and ANDSF for the routing of the data traffic over the 3GPP access to the EPC.

Figure 9:
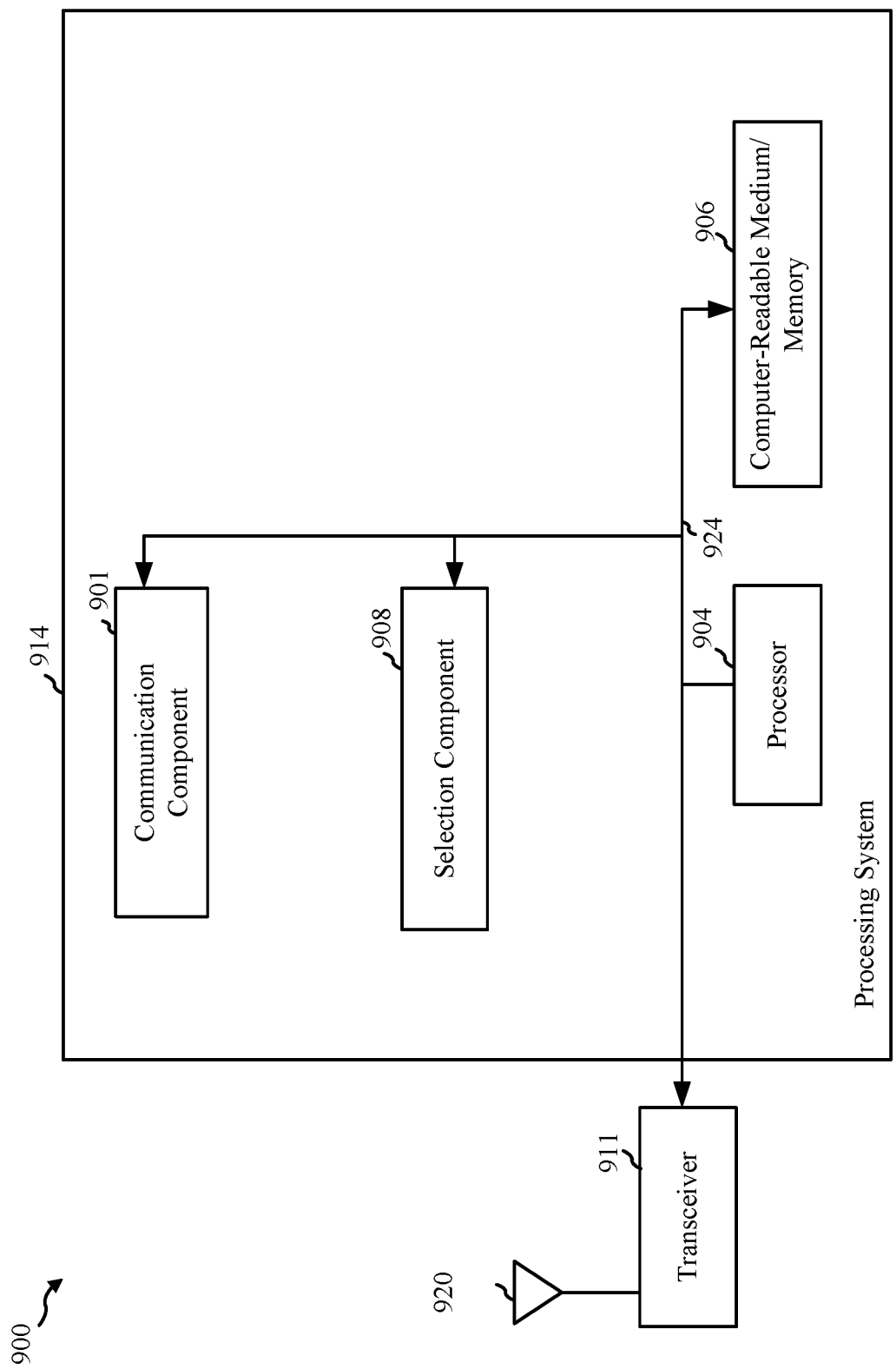
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 914 coupled to a transceiver 911. The transceiver 911 is configured to transmit and receive signals for the communications device 900 via an antenna 920, such as the various signal described herein. The processing system 914 may be configured to perform processing functions for the communications device 900, including processing signals received and/or to be transmitted by the communications device 900.

The processing system 914 may include a processor 904 which may be coupled to a computer-readable medium/memory 906 via a bus 924. In certain aspects, the computer-readable medium/memory 906 is configured to store instructions that when executed by processor 904, cause the processor 904 to perform the operations illustrated in FIG. 8, or other operations for performing the various techniques discussed herein.

In certain aspects, the processing system 914 further includes a communicating component 901 for performing the operations illustrated at block 804 in FIG. 8. Additionally, the processing system 914 includes a selection component 908 for performing the operations illustrated at block 802 in FIG. 8. The communication component 901 may be also be configured to establish a PDN connection, as described herein. The communicating component 901 and selection component 908 (e.g., for selecting a policy for routing of data) may be coupled to the processor 904 via bus 924. In certain aspects, the communicating component 901 and the selection component 908 may be hardware circuits. In certain aspects, the communicating component 901 and selection component 908 may be software components that are executed and run on processor 904.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user-equipment (UE), comprising:
selecting at least one policy for routing of data traffic to a network, wherein the at least one policy comprises an access network discovery and selection policy (ANDSP) if the UE has the ANDSP provisioned regardless of whether the UE is registered to evolved packet core (EPC) or fifth-generation core network (5GCN), and wherein if the UE is connected over a third generation partnership project (3GPP) access to the 5GCN, the at least one policy comprises a UE routing selection policy (URSP) for the routing of the data traffic; and
communicating the data traffic to the network based on the selection.

2. The method of claim 1, wherein the at least one policy includes the URSP if the UE is registered to the 5GCN.

3. The method of claim 1, wherein, if the UE is connected over the 3GPP access to the 5GCN and has connectivity over a non-3GPP access to the EPC via an evolved packet data gateway (ePDG), the at least one policy includes:
the URSP for the routing of the data traffic over the 3GPP access via the 5GCN;
access network discovery and selection function (ANDSF) rules for the routing of the data traffic over the non-3GPP access via the ePDG; and
the ANDSP for selecting the ePDG.

4. The method of claim 1, wherein, if the UE is connected over the 3GPP access to the EPC and has connectivity over a non-3GPP access to the 5GCN via a non-3GPP interworking function (N3IWF), the at least one policy includes:
the URSP for the routing of the data traffic over the N3IWF;

access network discovery and selection function (ANDSF) rules for the routing of the data traffic over the 3GPP access to the EPC; and the ANDSP for selecting the N3IWF.

5. The method of claim 1, wherein:

if the UE is connected to the 5GCN via a non-3GPP inter-working function (N3IWF), the at least one policy includes the URSP for the routing of the data traffic via the N3IWF.

6. The method of claim 1, wherein if the UE is connected to the EPC via an evolved packet data gateway (ePDG), the at least one policy includes access network discovery and selection function (ANDSF) rules for the routing of the data traffic via the ePDG.

7. The method of claim 1, wherein if the UE is connected over the 3GPP access to the EPC, the at least one policy includes access network discovery and selection function (ANDSF) rules for the routing of the data traffic.

8. The method of claim 7, wherein a wireless local area network selection policy (WLANSP) of the ANDSP is the same as the WLANSP of the ANDSF rules.

9. The method of claim 1, further comprising selecting an evolved packet data gateway (ePDG) based on the ANDSP for the routing of the data traffic, wherein the UE does not perform access node selection of the ePDG based on access network discovery and selection function (ANDSF) rules after the selection of the ePDG.

10. The method of claim 9, further comprising establishing a packet data network (PDN) connection for the routing of the data traffic over the ePDG by selecting an access point name (APN) for the PDN connection based on an inter-APN routing policy (IARP).

11. The method of claim 1, wherein selecting the at least one policy further comprises selecting a non-3GPP inter-working function (N3IWF) based on the ANDSP if access network discovery and selection function (ANDSF) rules do not include N3IWF selection information, wherein the data traffic is routed over the selected N3IWF.

12. The method of claim 11, further comprising establishing a data network name (DNN) connection for the routing of the data traffic over the N3IWF by selecting a DNN based on a URSP rule.

13. The method of claim 1, wherein the at least one policy comprise the ANDSP for the selection of a non-3GPP access node if the UE has the ANDSP provisioned regardless of whether the UE is registered to the EPC or the 5GCN.

14. An apparatus for wireless communication by a user-equipment (UE), comprising:

a processing system configured to select at least one policy for routing of data traffic to a network, wherein the at least one policy comprises an access network discovery and selection policy (ANDSP) if the apparatus has the ANDSP provisioned regardless of whether the apparatus is registered to evolved packet core (EPC) or fifth-generation core network (5GCN), wherein if the UE is connected over a third generation partnership project (3GPP) access to the 5GCN, the at least one policy comprises a UE routing selection policy (URSP) for the routing of the data traffic; and a transceiver configured to communicate the data traffic to the network based on the selection.

15. The apparatus of claim 14, wherein the at least one policy includes the URSP if the apparatus is registered to the 5GCN.

16. The apparatus of claim 14, wherein, if the apparatus is connected over the 3GPP access to the 5GCN and has connectivity over a non-3GPP access to the EPC via an evolved packet data gateway (ePDG), the at least one policy includes:

the URSP for the routing of the data traffic over the 3GPP access via the 5GCN;

access network discovery and selection function (ANDSF) rules for the routing of the data traffic over the non-3GPP access via the ePDG; and the ANDSP for selecting the ePDG.

17. The apparatus of claim 14, wherein, if the apparatus is connected over the 3GPP access to the EPC and has connectivity over a non-3GPP access to the 5GCN via a non-3GPP inter-working function (N3IWF), the at least one policy includes:

the URSP for the routing of the data traffic over the N3IWF;

access network discovery and selection function (ANDSF) rules for the routing of the data traffic over the 3GPP access to the EPC; and the ANDSP for selecting the N3IWF.

18. The apparatus of claim 14, wherein:

if the apparatus is connected to the 5GCN via a non-3GPP inter-working function (N3IWF), the at least one policy includes the URSP for the routing of the data traffic via the N3IWF.

19. The apparatus of claim 14, wherein if the apparatus is connected to the EPC via an evolved packet data gateway (ePDG), the at least one policy includes access network discovery and selection function (ANDSF) rules for the routing of the data traffic via the ePDG.

20. The apparatus of claim 14, wherein if the apparatus is connected over the 3GPP access to the EPC, the at least one policy includes access network discovery and selection function (ANDSF) rules for the routing of the data traffic.

21. The apparatus of claim 20, wherein a wireless local area network selection policy (WLANSP) of the ANDSP is the same as the WLANSP of the ANDSF rules.

22. The apparatus of claim 14, further comprising selecting an evolved packet data gateway (ePDG) based on the ANDSP for the routing of the data traffic, wherein the apparatus does not perform access node selection of the ePDG based on access network discovery and selection function (ANDSF) rules after the selection of the ePDG.

23. The apparatus of claim 22, further comprising establishing a packet data network (PDN) connection for the routing of the data traffic over the ePDG by selecting an access point name (APN) for the PDN connection based on an inter-APN routing policy (IARP).

24. The apparatus of claim 14, wherein selecting the at least one policy further comprises selecting a non-3GPP inter-working function (N3IWF) based on the ANDSP if access network discovery and selection function (ANDSF) rules do not include N3IWF selection information, wherein the data traffic is routed over the selected N3IWF.

25. The apparatus of claim 24, further comprising establishing a data network name (DNN) connection for the routing of the data traffic over the N3IWF by selecting a DNN based on a URSP rule.

26. The apparatus of claim 14, wherein the at least one policy comprise the ANDSP for the selection of a non-3GPP access node if the apparatus has the ANDSP provisioned regardless of whether the apparatus is registered to the EPC or the 5GCN.

27. A computer-readable medium having instructions stored thereon to cause an apparatus comprising a user-equipment (UE) to:

select at least one policy for routing of data traffic to a network, wherein the at least one policy comprise an access network discovery and selection policy (ANDSP) if the apparatus has the ANDSP provisioned regardless of whether the apparatus is registered to evolved packet core (EPC) or fifth-generation core network (5GCN), wherein if the UE is connected over a third generation partnership project (3GPP) access to the 5GCN, the at least one policy comprises a UE routing selection policy (URSP) for the routing of the data traffic; and communicate the data traffic to the network based on the selection.

28. An apparatus for wireless communication by a user-equipment (UE), comprising:

means for selecting at least one policy for routing of data traffic to a network, wherein the at least one policy comprise an access network discovery and selection policy (ANDSP) if the apparatus has the ANDSP provisioned regardless of whether the apparatus is registered to evolved packet core (EPC) or fifth-generation core network (5GCN), wherein if the UE is connected over a third generation partnership project (3GPP) access to the 5GCN, the at least one policy comprises a UE routing selection policy (URSP) for the routing of the data traffic; and means for communicating the data traffic to the network based on the selection.

* * * * *